US006968211B2

(12) United States Patent
Miya

(10) Patent No.: US 6,968,211 B2
(45) Date of Patent: Nov. 22, 2005

(54) RADIO BASE STATION APPARATUS AND RADIO COMMUNICATION METHOD

(75) Inventor: Kazuyuki Miya, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 663 days.

(21) Appl. No.: 09/936,616

(22) PCT Filed: Dec. 13, 2000

(86) PCT No.: PCT/JP00/08799

§ 371 (c)(1),
(2), (4) Date: Sep. 17, 2001

(87) PCT Pub. No.: WO01/54306

PCT Pub. Date: Jul. 26, 2001

(65) Prior Publication Data

US 2002/0160814 A1 Oct. 31, 2002

(30) Foreign Application Priority Data

Jan. 19, 2000 (JP) ....................... 2000-009701

(51) Int. Cl.$^7$ ............................. H04B 7/26; H04M 1/00
(52) U.S. Cl. .................... 455/562.1; 455/296; 455/561; 370/334; 375/148
(58) Field of Search ............................ 455/561, 562.1, 455/278.1, 296, 63.1, 67.13, 303, 69, 276.1, 101–102; 375/148–149, 346; 370/334

(56) References Cited

U.S. PATENT DOCUMENTS

| 5,999,826 | A  | * | 12/1999 | Whinnett ...................... 455/561 |
| 6,188,718 | B1 | * | 2/2001  | Gitlin et al. .................. 375/148 |
| 6,192,256 | B1 | * | 2/2001  | Whinnett .................. 455/562.1 |
| 6,243,412 | B1 | * | 6/2001  | Fukawa ....................... 375/219 |
| 6,404,759 | B1 | * | 6/2002  | Shoji .......................... 370/342 |
| 6,480,482 | B1 | * | 11/2002 | Shoji .......................... 370/342 |
| 6,501,943 | B1 | * | 12/2002 | Ide et al. .................... 455/101 |
| 6,600,729 | B1 | * | 7/2003  | Suzuki ........................ 370/335 |
| 6,636,729 | B1 | * | 10/2003 | Hiramatsu et al. ........ 455/278.1 |
| 6,771,986 | B1 | * | 8/2004  | Oh ........................... 455/562.1 |
| 2002/0044591 | A1 | * | 4/2002  | Lee et al. ................... 375/130 |

FOREIGN PATENT DOCUMENTS

| JP | 05206907 | 8/1993 |
| JP | 07015381 | 1/1995 |
| JP | 10013262 | 1/1998 |
| JP | 10190495 | 7/1998 |
| JP | 11168408 | 6/1999 |
| JP | 11298388 | 10/1999 |
| JP | 11331125 | 11/1999 |

OTHER PUBLICATIONS

International Search Report dated Mar. 13, 2001.

N. Ishii, et al.; "CDMA Multiuser Time–Space Interference Cancellation System", NEC C&C Media Research Laboratory, B–5–126, p. 490, 1998.

K. Fukawa, et al.; "Combination of MMSE Adaptive Array with Nonlinear Interference Canceller and its Performance", NTT Mobile Communications Network Inc., B–406, p. 407, 1996.

(Continued)

*Primary Examiner*—William Trost
*Assistant Examiner*—Brandon J. Miller
(74) *Attorney, Agent, or Firm*—Stevens, Davis, Miller & Mosher, LLP

(57) ABSTRACT

Focused on group directivity reception with respect to a combination between an adaptive array antenna technology and an interference canceller, the present invention is intended to improve the reception characteristic and improve the system capacity by generating a reference signal from the signal after interference elimination, using a difference between the reference signal and the signal after adaptive array antenna reception as an error signal and carrying out group directivity control.

3 Claims, 8 Drawing Sheets

OTHER PUBLICATIONS

M. Tsutsui, et al.; "Interference canceller with array antenna and partial cancellar for high rate users in DS–CDMA systems", Technical Report of IEICE. CS98–27(May 1998), pp. 19–23, with English abstract.

X. Mestre, et al.; "Uplink Beamforming for the FDD Mode of Utra", VTC '99–s.

N. Ishii, et al.; "CDMA Multiuser Time–Space Interference Cancellation System", NEC C&C Media Research Laboratory, B–5–126, p. 490, 1998, with partial English Translation.

K. Fukawa, et al.; "Combination of MMSE Adaptive Array with Nonlinear Interference Canceller and its Performance", NTT Mobile Communications Network Inc., B–406, p. 407, 1996, with partial English Translation.

* cited by examiner

RADIO BASE STATION APPARATUS AND RADIO COMMUNICATION METHOD

TECHNICAL FIELD

The present invention relates to a radio base station apparatus and radio communication method in a digital radio communication, and more particularly, to a radio base station apparatus and radio communication method capable of improving reception characteristics of uplink signals and increasing the system capacity in a DS-CDMA (Direct Sequence-Code Division Multiple Access) system.

BACKGROUND ART

In digital radio communications, an adaptive array antenna (hereinafter referred to as "AAA") technology is used which controls directivities adaptively by adding weights to antenna outputs from a plurality of antenna elements. This AAA technology can suppress interference signals taking advantage that signals arrive from different directions and controlling directivities adaptively. Thus, the adaptive array antenna technology is an ideal method for eliminating interference signals on a same channel.

On the other hand, in digital radio communications, an interference canceller technology is used which estimates interference signals as well as desired signals based on maximum likelihood specifications. This interference canceller technology can eliminate interference signals from an identical direction, which cannot be eliminated by the AAA technology.

In recent years, an effort is underway to combine the AAA technology and interference canceller technology to make the most of features of both technologies. An example of this is a configuration combining the AAA and a Viterbi equalizer (MLSE: Maximum Likelihood Sequence Estimator) as a non-linear interference canceller ("Cascade Connection of Adaptive Array Least Square Combination and Non-Linear Interference Canceller and Characteristics" (Pukawa et al, 1996 Institute of Electronics, Information and Communication Engineers Communication Society Conference B-406)). In this configuration, the MLSE eliminates and detects interference signals in an identical direction which cannot be eliminated by the AAA, but the MLSE involves a problem that the amount of processing grows exponentially with respect to the number of interference signals to be eliminated. For this reason, the MLSE is generally used as an equalizer intended to eliminate interference between codes that occurs generally depending on the degree of delayed signals of the own channel.

However, a CDMA system has generally more multiple channels received at a same time and a same frequency than a TDMA (Time Division Multiple Access) system or FDMA (Frequency Division Multiple Access) system or other access systems. In the TDMA system, for example, only one channel signal exists in one slot and the own channel delayed signal is the only interference signal (delayed signals of previous slot signals are also added in high-speed transmission), while in the CDMA system, a plurality of channels are code-multiplexed in one slot.

The AAA in a cellular system is generally subject to restrictions on the number of antennas because of problems involving installation of antennas and power lines or from the standpoint of costs of its radio section and signal processing section and though the AAA focuses directivities, it actually has a beam width of 10 degrees or more. For this reason, it is difficult to spatially separate the AAA from other channels completely. Since, as described above, the CDMA system in particular has more other channel signals in the focused directivities than other access systems, the CDMA system includes more signals to be eliminated by an interference canceller. Thus, combining the AAA and MLSE in the CDMA system results in a problem that the amount of MLSE processing will increase exponentially and thereby increase the hardware scale.

DISCLOSURE OF THE INVENTION

It is an object of the present invention to provide a radio base station apparatus and radio communication method capable of improving reception characteristics of uplink signals and increasing the system capacity by combining an AAA and an interference canceller without increasing the hardware scale.

In view of the above-described problems, as an interference canceller in the CDMA system, and more particularly an interference canceller used for a base station apparatus that can know information of other channels, a multi-user type interference canceller (MUD: Multi User Detection) is considered to be more advantageous in terms of characteristics and hardware scale than the MLSE. This is because with the MUD, the hardware scale grows in proportion to the number N of channels to be eliminated but not more than N times.

However, if each channel receives signals using an AAA individually, an individual MUD is required according to each directivity, and if the amount of processing of the MUD corresponding to one AAA reception signal (that eliminates interference corresponding to N channels) is assumed to be M, then there is a problem that AAA reception corresponding to N channels will require an amount of processing corresponding to (N direction patterns)×M.

To solve this problem, it is possible to group a plurality of channels (users), group channels in almost identical directions and apply group directivity reception (group weight (GW) reception) for receiving with an identical directivity (identical weight) to channels of a same group. In the above-described example, if N=100 and the number of GWs is 4, the amount of processing 100M becomes 4M, that is, reduced to $\frac{1}{25}$.

The present inventor has come up with the present invention focused on group directivity reception with respect to a combination of the above-described AAA technology and an interference canceller. That is, a main point of the present invention is to generate a reference signal from a signal after elimination of interference, perform group directivity control using a difference between the reference signal and the post-AAA reception signal as an error signal and thereby provide a temporal/spatial interference canceller suited to a CDMA system, improve the reception characteristic and increase the system capacity.

BEST MODE FOR CARRYING OUT THE INVENTION

With reference now to the attached drawings, embodiments of the present invention will be explained in detail below.

(Embodiment 1)

Figure 1:
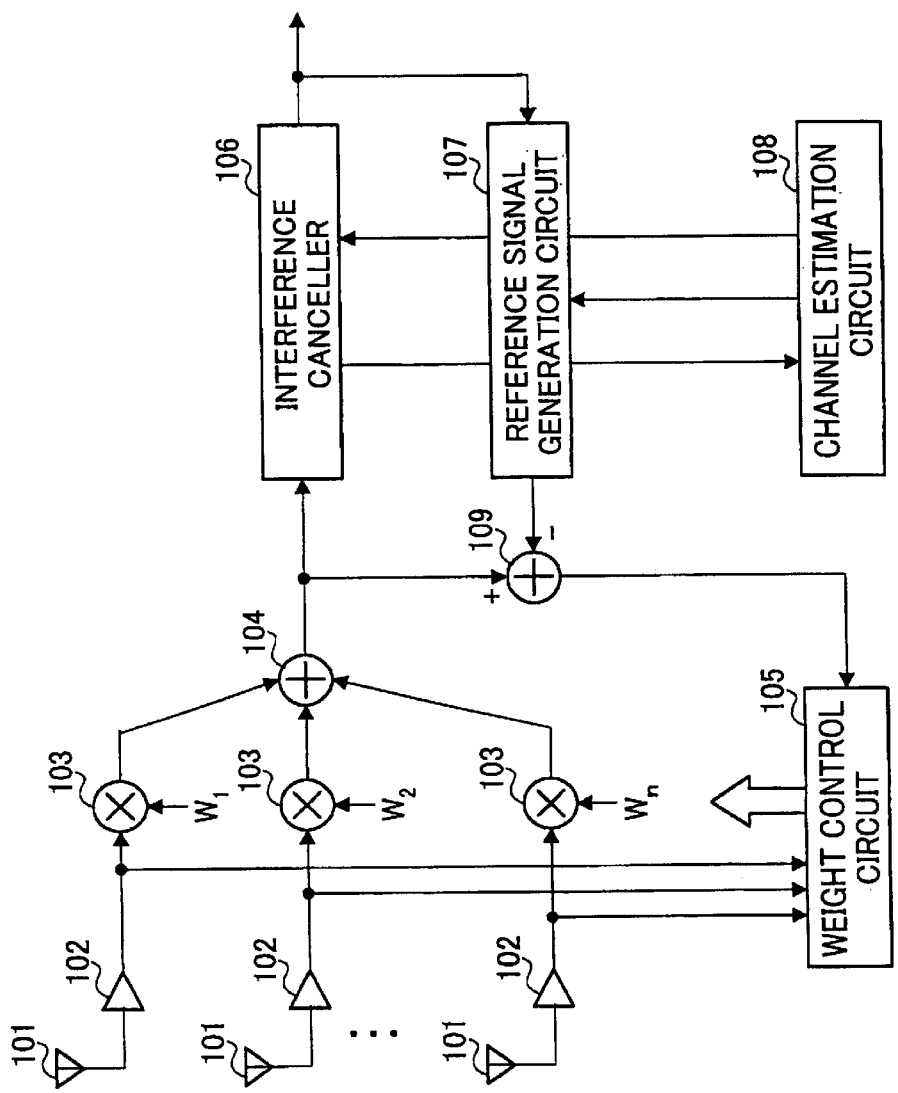
FIG. 1 is a block diagram showing a configuration of a radio base station apparatus according to Embodiment 1 of the present invention.

FIG. 1 is a block diagram showing a configuration of a radio base station apparatus according to Embodiment 1 of the present invention. The radio base station apparatus according to this embodiment carries out group directivity control using a signal subjected to interference canceller processing as a reference signal and using a difference between the reference signal and the post-AAA reception signal as an error signal.

A signal received through antenna 101 is subjected to predetermined radio reception processing (down-conversion and A/D conversion, etc.) and converted to a baseband signal at radio reception processing section 102. This received data (baseband signal) is sent to weight control circuit 105 and multiplier 103 at the same time.

Weight control circuit 105 estimates the direction of arrival from the received data and carries out reception weights corresponding to the received data using the result of the direction of arrival estimation. The weights resulting from the weight calculations are output to respective multipliers 103 and multiplied on the received data.

The signals multiplied by the respective reception weights are added up at adder 104. The added received data is sent to interference canceller 106. Interference canceller (MUD) 106 performs channel estimation from the received data, generates a replica signal of the interference signal using this channel estimated value, subtracts the replica signal from the received data and thereby removes the interference component and obtains demodulated data.

This demodulated data is sent to reference signal generation circuit 107. Reference signal generation circuit 107 reconstructs a signal equivalent to the post-AAA received data based on the channel estimated value obtained at channel estimation circuit 108. Channel estimation circuit 108 performs channel estimation based on the information from interference canceller 106.

The signal reconstructed at reference signal generation circuit 107 is output to adder 109. Adder 109 receives the post-AAA signal and calculates a difference between the reconstructed signal, which is the reference signal, and the post-AAA signal. This difference is sent to weight control circuit 105 as an error signal.

Weight control circuit 105 calculates a reception weight using, the error signal in such a way that this error becomes a minimum. The reception weight calculated at weight control circuit 105 is output to multiplier 103, where the received data is multiplied by the reception weight.

Then, an operation of the radio base station apparatus in the above configuration will be explained.

The signal sent from a communication terminal is AAA-received by multiplying the antenna output by a reception weight. During this AAA reception, weight control circuit 105 calculates a reception weight and controls the reception weight. More specifically, weight control circuit 105 estimates the direction of arrival with respect to the reception signal (uplink signal) of each channel (user), groups channels based on the estimation result of this direction of arrival and calculates a reception weight for each group (group weight). Here, the reception weight to form a direction pattern is not limited to the above-described group weight.

Thus, using a group weight reduces the number of directivity patterns using reception weights, and can thereby reduce the amount of calculation to calculate reception weights. Moreover, since the number of reception directivity patterns is reduced, the number of replica signals generated in interference cancellation processing is also reduced. This makes it possible to reduce the hardware scale of weight control circuit 105 and interference canceller 106.

Figure 2:
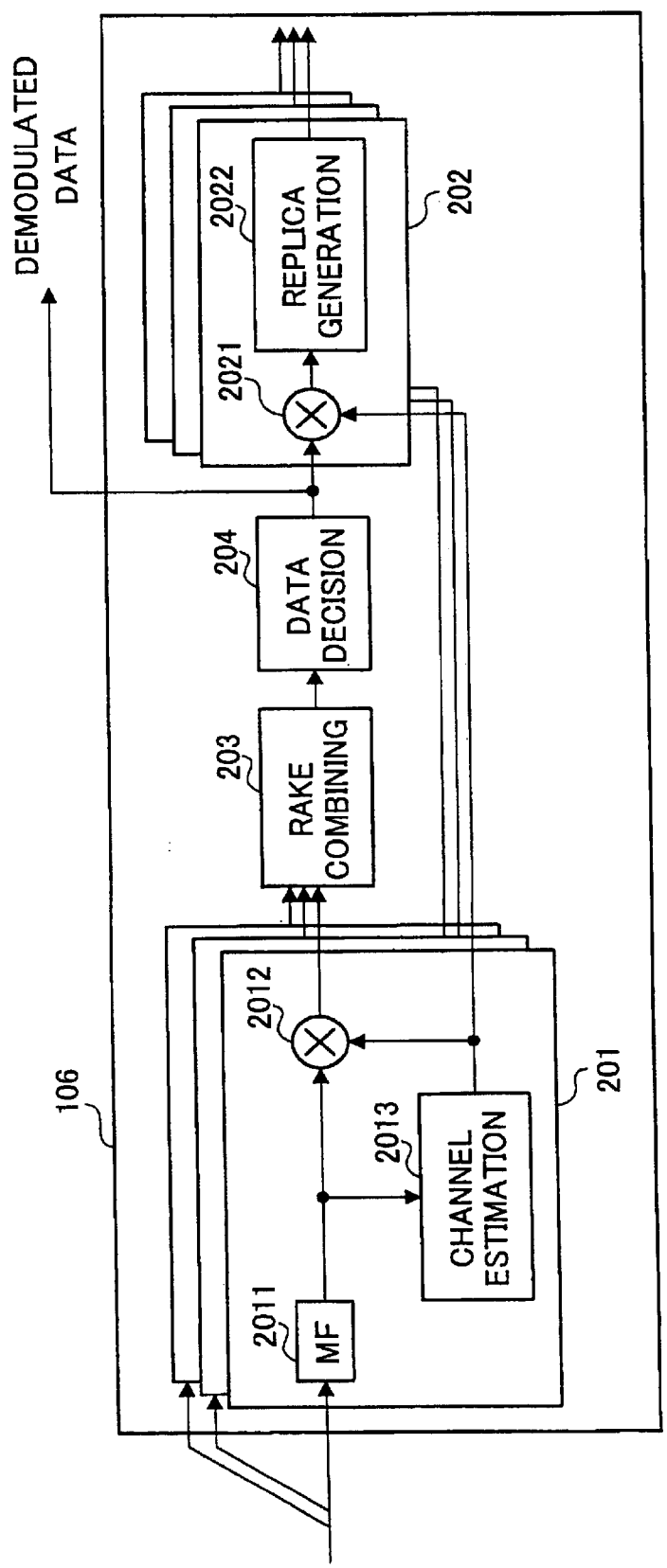
FIG. 2 is a block diagram showing a configuration of an interference canceller of the radio base station apparatus according to the above-described embodiment.

The post-AAA received data is input to interference canceller 106 and subjected to interference cancellation processing there. This interference canceller 106 includes a channel estimation/interference replica generation unit having a configuration as shown in FIG. 2. This channel estimation/interference replica generation unit generates a replica signal of user data, which becomes interference and subtracts this from the received data and obtains highly reliable demodulated data.

The channel estimation/interference replica generation unit includes channel estimation unit 201 that carries out channel estimation, replica generation unit 202 that generates an interference replica using the signal after data decision, RAKE combining section 203 that RAKE-combines the channel-estimated signals and data decision section 204 that carries out data decision on the RAKE-combined signal.

Since a plurality of channel estimation units 201 and a plurality of replica generation units 202 are provided according to the number of multi-path reception delayed signals, that is, the number of paths, the interference canceller can thereby generate an interference replica corresponding to the respective multi-path reception delayed signals.

Channel estimation unit 201 includes matched filter 2011 that performs despreading processing on the reception signal, channel estimation section 2013 that performs path channel estimation and multiplier 2012 that multiplies the despread signal which is the matched filter output by a complex conjugate of the channel estimated value estimated at channel estimation section 2013.

On the other hand, replica generation unit 202 includes multiplier 2021 that multiplies the data symbol after data decision by the channel estimated value obtained at channel estimation section 2013 and replica generation section 2022 that generates an interference replica by reapplying spreading processing to the data multiplied by the channel estimated value using the spreading code used at matched filter 2011.

For the channel estimation/interference replica generation unit in such a configuration, specific user data is sent to channel estimation unit 201 for every delayed signal. In channel estimation unit 201, matched filter 2011 carries out despreading processing on the user data using a spreading code and obtains a reception symbol.

The reception symbol obtained through despreading processing is sent to channel estimation section 2013. Channel estimation section 2013 carries out a channel estimation of the user data using a known signal such as a pilot symbol and obtains a channel estimated value. Then, multiplier 2012 carries out coherent detection by multiplying the above-described reception symbol by the complex conjugate of this channel estimated value. Multiplier 2012, then sends the respective reception symbols to RAKE combining section 203.

RAKE combining section 203 RAKE-combines reception symbols of the respective delayed signals and sends the RAKE-combined reception symbols to data decision section 204. Data decision section 204 carries out data decision on the RAKE-combined reception symbols and obtains data symbols.

The data symbols subjected to data decision are multiplied by channel estimated values obtained from channel estimation sections 2013 of the respective channel estimation units 201 through multiplier 2021 of the replica generation unit 202 which is separated at the timing of each delayed signal according to the delayed signals.

The symbol after multiplication is sent to each replica generation section 2022, where the symbol is subjected to re-spreading/modulation processing using the spreading code used at matched filter 2011. The re-spread/modulated signals obtained here are combined into an interference replica signal of the user channel.

The configuration shown in FIG. 2 is an example of the unit that carries out channel estimation and replica generation, but the present invention is not limited to this.

Interference canceller 106 carries out demodulation by subtracting replica signals of users other than specific users from the received data using interference replica signals obtained at the channel estimation/interference replica generation unit and thereby obtains highly reliable demodulated data.

The highly reliable demodulated data obtained at interference canceller 106 in this way is input to reference signal generation circuit 107, where the post-AAA received data is reconstructed. In this reconstruction, reference signal generation circuit 107 sends the despread signal despread by a specific spreading code at interference canceller 106 to channel estimation circuit 108 and then performs re-spreading using the specific spreading code used for despreading using the channel estimated value obtained at channel estimation circuit 108 and generates a replica signal of the post-AAA received data.

A difference between the reference signal of the post-AAA received data and actual post-AAA received data is calculated. This difference is sent to weight control circuit 105 as an error signal. This error signal is equivalent to the reception weight error calculated by weight control circuit 105. Therefore, a reception weight is recalculated in such a way as to minimize this error. This reception weight is output to multiplier 103 and multiplied on the received data. As the adaptive signal processing to minimize this error, an LMS (Least Mean Square) algorithm or RLS (Recursive Least Square) algorithm, etc. can be used.

As shown above, in the radio base station apparatus according to this embodiment, weight control circuit 105 generates an error signal using a replica signal and carries out weight control adaptively using the error signal, and can thereby perform AAA reception with high accuracy. In this case, since a replica signal is generated using the signal subjected to interference cancellation processing, this embodiment improves the reliability of the error signal and can also perform weight control with high accuracy.

Thus, this embodiment can improve the reception characteristics of uplink signals. This improves the reception performance of uplink signals and can thereby reduce transmit power at the communication terminal, resulting in a reduction of interference in the system and an increase in the system capacity.

(Embodimemt 2)

In the radio base station apparatus shown in FIG. 1, interference canceller 106 estimates user data channels and generates a replica signal, channel estimation circuit 108 performs channel estimation for weight control and reference signal generation circuit 107 generates a replica signal.

Figure 3:
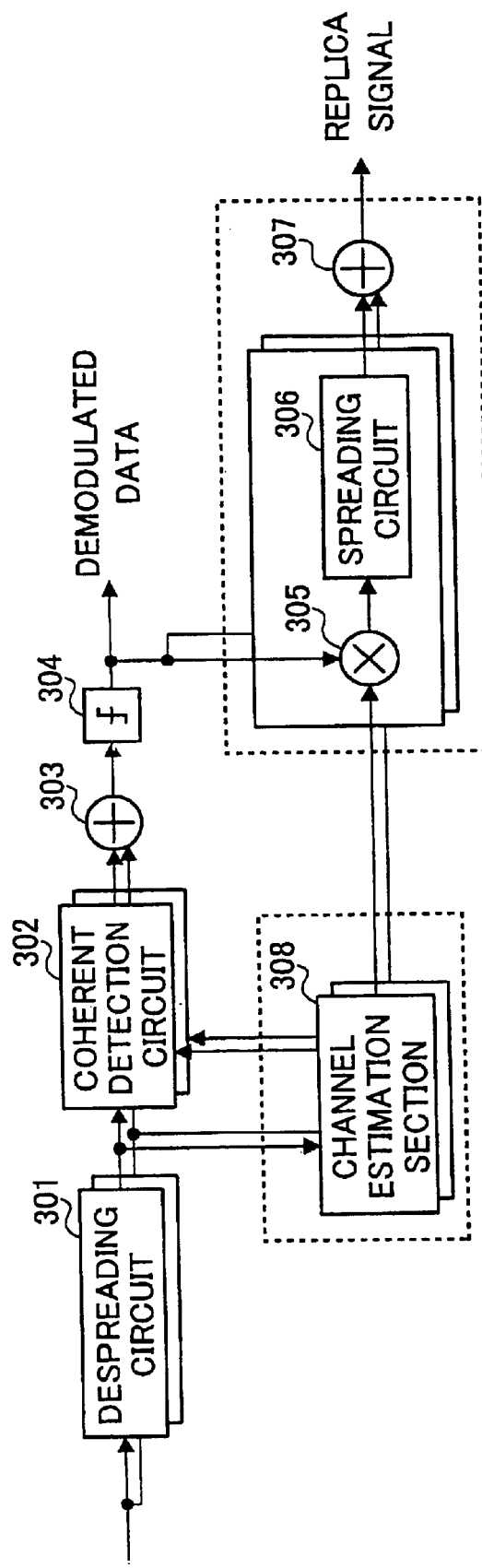
FIG. 3 is a block diagram showing part of a configuration of a radio base station apparatus according to Embodiment 2 of the present invention.

Then, as shown in FIG. 3, it is possible to reduce the hardware scale by rendering reference signal generation circuit 107 that generates a reference signal from a signal subjected to interference cancellation processing and channel estimation circuit 108 to also serve as the replica generation section and channel estimation section in interference canceller 106.

FIG. 3 is a block diagram showing part of a configuration of a radio base station apparatus according to Embodiment 2 of the present invention. In this configuration, despreading circuit 301 despreads post-AAA received data using a specific spreading code and outputs the despread signal obtained to coherent detection circuit 302 and channel estimation circuit 308.

Coherent detection circuit 302 carries out coherent detection on the received data using a channel estimated value obtained from channel estimation circuit 308. The signal subjected to coherent detection is RAKE-combined by combining-circuit 303. This combined signal is sent to data decision circuit 304, subjected to data decision and converted to demodulated data.

This demodulated data is input to spreading circuit 306 after being multiplied by the channel estimated value at multiplier 305. Spreading circuit 306 applies spreading/modulation processing to the demodulated data with the channel estimated value multiplied using the spreading code used for despreading and obtains a replica signal. This replica signal is used for interference cancellation processing and at the same time used as a reference signal.

That is, a difference between this replica signal and the post-AAA received data is calculated and this difference is sent to weight control circuit 105 as an error signal. Weight control circuit 105 performs weight control in the same way as in Embodiment 1.

Thus, the radio base station apparatus according to this embodiment can improve the reception characteristic of uplink signals and increase the system capacity, and use same interference canceller for channel estimation and replica generation and can thereby reduce the hardware scale.

(Embodiment 3)

Figure 4:
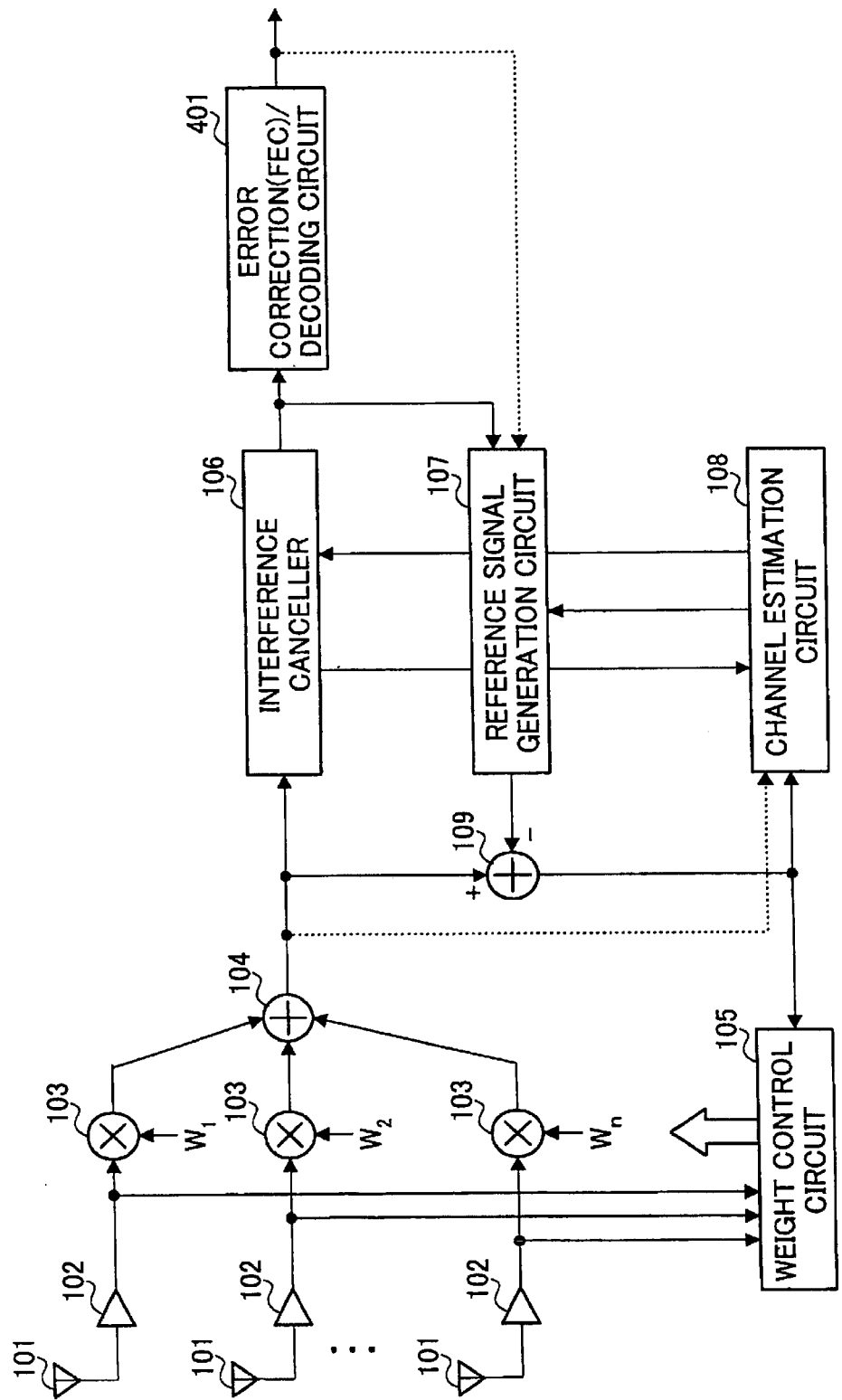
FIG. 4 is a block diagram showing a configuration of a radio base station apparatus according to Embodiment 3 of the present invention.

This embodiment describes a modification example of the radio base station apparatus of the present invention. FIG. 4 is a block diagram showing a configuration of a radio base station apparatus according to Embodiment 3 of the present invention. In FIG. 4, the same parts as those in FIG. 1 are assigned the same reference numerals as those in FIG. 1 and detailed explanations thereof will be omitted.

First, a modification example of replica signal generation will be explained. The following three methods are available to generate a replica signal:

(1) Using only known signal after interference cancellation processing (e.g., pilot signal)

(2) Using provisional decision signal of information data in addition to pilot signal (3) Using output of error correction(FEC)/decoding circuit 401 or decision data (after deinterleave+error correction (FEC)/decoding in general) when information data section is used In this method, a control delay increases, but the reliability of a replica signal which becomes a reference signal is improved, allowing AAA weight control with higher accuracy.

Figure 5:
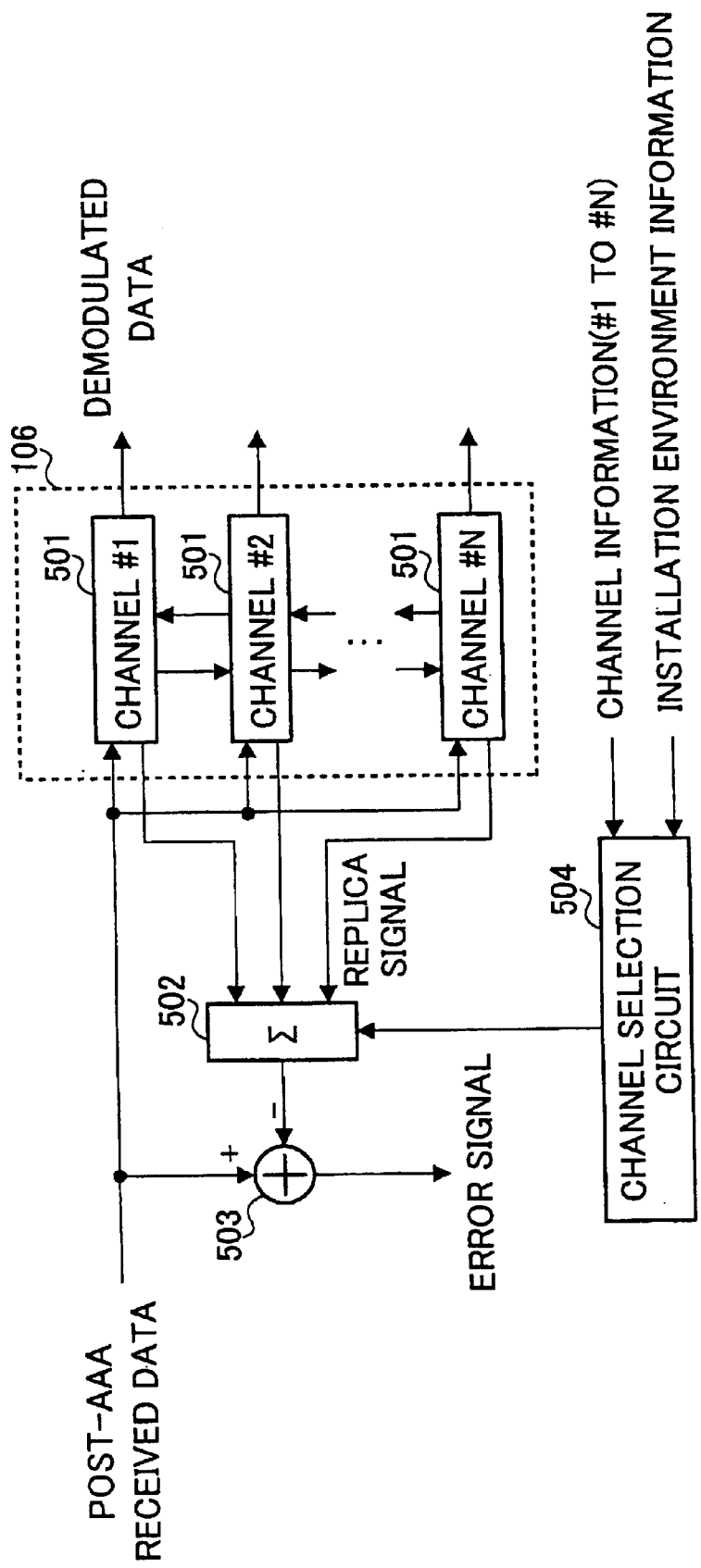
FIG. 5 is a block diagram showing part of the configuration of the radio base station apparatus according to Embodiment 3 of the present invention.

Then, a modification example of group directivity control will be explained FIG. 5 is a block diagram showing part of a configuration of the radio base station apparatus according to Embodiment 3 of the present invention. Channel selection in a group used for replica generation will be explained using FIG. 5.

This configuration includes a plurality of channel processing circuits 501, combining circuit 502 for combining replica signals obtained at channel processing circuits 501 and channel selection circuit 504 for selecting a channel used for replica generation from various information. Reference numeral 503 denotes an adder for calculating a difference between post-AAA received data and a replica signal.

The following five methods are available for channel selection in a group used for replica generation.

(1) Selecting all channels that belong to a group determined by classifying a plurality of channels (2) Selecting channel according to transmission rate (information transmission rate). A channel with a high transmission rate has high signal transmit power and high power consumption, and therefore it is necessary to form the best possible directivity to reduce transmit power through transmit power control. Thus, at least one of channels with a high transmission rate in the group is selected. This makes it possible to form better directivity and reduce transmit power through transmit power control. Thus, interference is suppressed by reducing transmit power differences from channels with low transmission rates.

(3) Selecting channel according to distance from communication terminal, Since a channel of a far communication terminal has high transmit power and high power consumption, it is necessary to form the best possible directivity to reduce transmit power through transmit power control. Thus, at least one of channels of far communication terminals in the group is selected. This makes it possible to form better directivity and reduce transmit power through transmit power control. As a result, the load on the communication terminal can be reduced (extending the battery life). Furthermore, when the communication terminal is nearer the cell edge (farther from the base station apparatus), it produces greater interference with other cells, and therefore it is possible to reduce interference with other cells from that point by forming optimal directivity and reducing transmit power through transmit power control.

(4) Selecting channel according to number of channels or likelihood of reception signal (amplitude or power). With regard to likelihood of a reception signal (amplitude or power), a channel with greater signal likelihood produces greater interference. On the other hand, it is easy for such a channel to form correct directivity. This makes it possible to form optimal directivity with accuracy and reduce transmit power through transmit power control and reduce interference with other channels. Furthermore, with regard to the number of channels, it is possible to reduce the hardware scale by simply reducing the number of targets.

(5) setting parameters according to processing capacity of interference canceller (removing up to what extent, etc.) or installation environment (whether communication terminals are easily concentrated on a same direction or easily distributed uniformly, etc.). These parameters are specific to each apparatus and the installation location, and therefore appropriate parameters are selected when each apparatus is installed.

By the way, the number of channels can also be selected by combining these parameters as appropriate.

In the configuration shown in FIG. 5, channels processing circuit 501 of interference canceller 106 generates a replica signal and outputs to combining circuit 502. On the other hand, channel selection circuit 504 receives channel information according to the parameters described in (1) to (5) above, apparatus information of the interference canceller and installation environment information of the base station apparatus. Channel selection circuit 504 selects a channel to be used for the replica signal according to the channel information and installation environment information, etc. This channel selection information is output to combining circuit 502.

Of the replica signals from channel processing circuit 501, combining circuit 502 combines the replica signals corresponding to the selected channel according to the channel selection information from channel selection circuits 504. The combined replica signal is output to adder 503. Adder 503 calculates a difference between the post-AAA received data and the combined replica signal. This difference is sent to the weight control circuit as an error signal and subjected to weight control as explained in Embodiment 1. It is also possible to limit the symbols to be used as a reference signal to only symbols whose reception signal likelihood (amplitude or power) is at a level of a certain threshold or higher from among the selected channels to generate a reference signal with higher accuracy.

Thus, since the radio base station apparatus according to this embodiment also generates replica signals using signals subjected to interference cancellation processing, the reliability of an error signal is improved, making it possible to also carry out weight control with high accuracy. This makes it possible to improve the reception characteristics of uplink signals. This makes it possible to improve the reception performance of uplink signals and thus reduce transmit power at the communication terminal and as a result, reduce interference in the system and increase the system capacity.

Especially, by selecting a channel for generating a replica signal, it is possible to reduce the amount of calculation. Also by selecting a channel with high transmit power, it is possible to generate a replica signal accurately and at the same time reduce transmit power of the channel through transmit power control, and thereby reduce interference with other stations.

(Embodiment 4)

Figure 6:
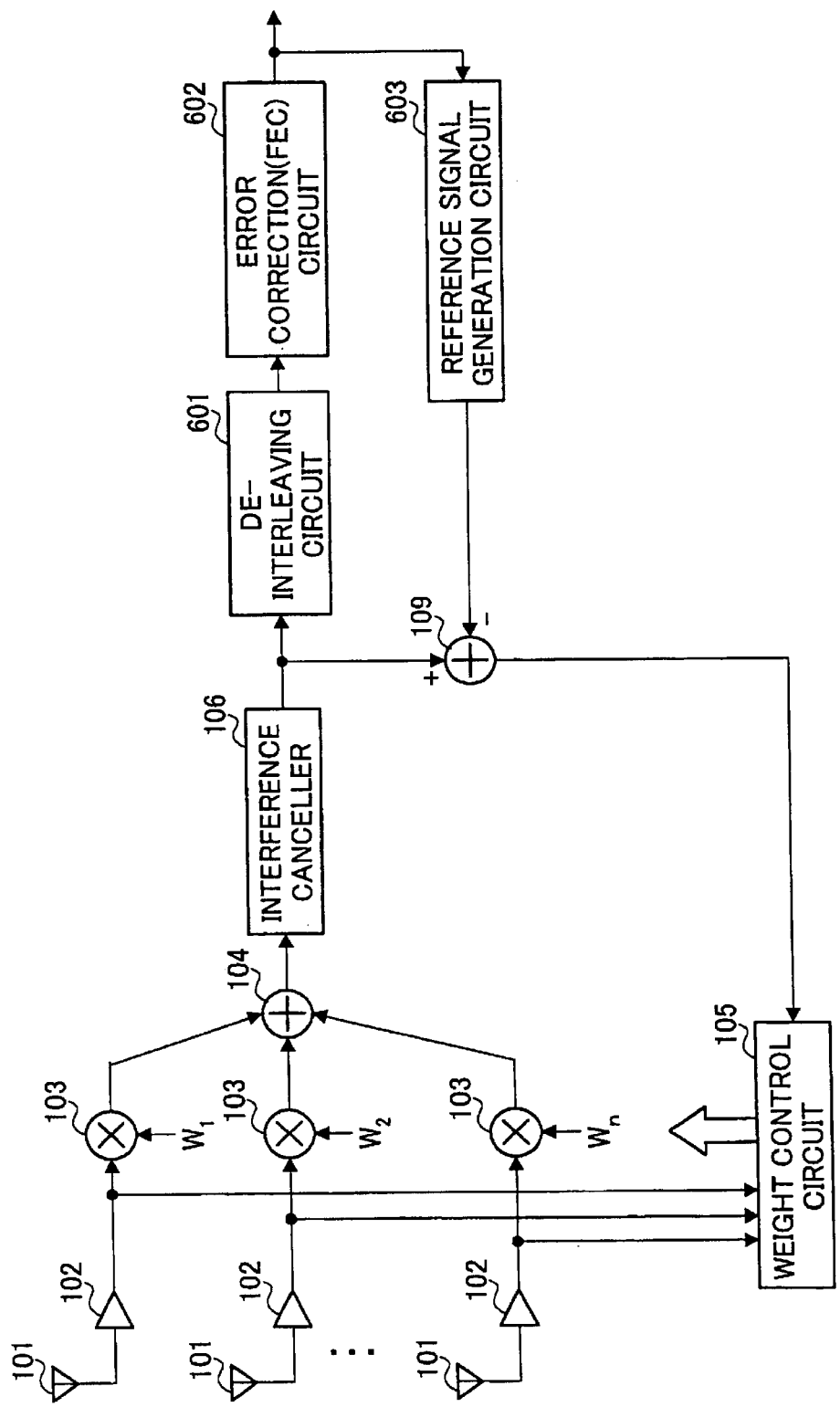
FIG. 6 is a block diagram showing a configuration of a radio base station apparatus according to Embodiment 4 of the present invention.

FIG. 6 is a block diagram showing a configuration of a radio base station apparatus according to Embodiment 4 of the present invention. In FIG. 6, the same parts as those in FIG. 1 are assigned the same reference numerals and detailed explanations thereof will be omitted.

This embodiment describes a radio base station apparatus that uses a signal subjected to interference canceller processing and then error correction(FEC)/decoding as a reference signal and carries out group directivity control using a difference between the reference signal and a post-AAA reception signal as an error signal.

The operations after the signal from the communication terminal is AAA received by antenna 101 until the signal is subjected to interference cancellation processing at interference canceller 106 are the same as that in Embodiment 1.

The demodulated data subjected to interference canceller processing is sent to de-interleaving circuit 601, deinterleaved there and sent to error correction(FEC) circuit 602. Error correction(FEC) circuit 602 carries out error correction processing on the deinterleaved and demodulated data. The data subjected to error correction processing is sent to reference signal generation circuit 603. Reference signal generation circuit 603 generates a replica signal using the data subjected to error correction processing. The operations after a replica signal is generated by reference signal generation circuit 603, a difference between the replica signal and post-AAA received data is calculated until reception weights are controlled using the difference as an error signal are the same as those in Embodiment 1.

Since the radio base station apparatus according to this embodiment also generates a replica signal using a signal subjected to interference cancellation processing, it is possible to improve the reliability of an error signal and carry out weight control with high accuracy. This makes it possible to improve the reception characteristics of uplink signals. Generating replica signals using signals subjected to error correction processing will increase control delays, but also increase the reliability of a replica signal, which becomes a reference signal allowing AAA weight control with higher accuracy.

Figure 7:
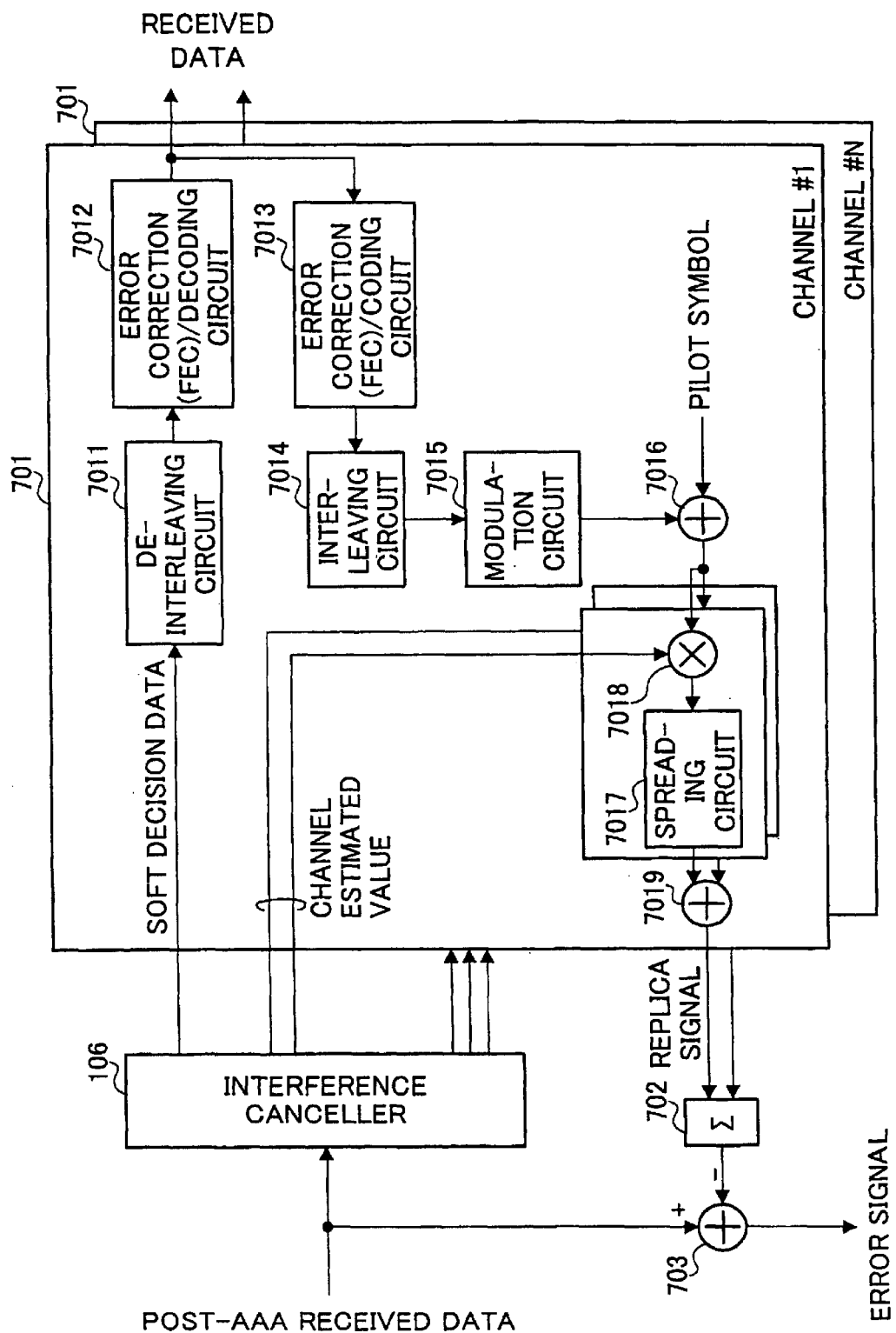
FIG. 7 is a block diagram showing part of the configuration of the radio base station apparatus according to the above-described embodiment.

FIG. 7 is a block diagram showing a configuration of part of the radio base station apparatus according to this embodiment. In this configuration, the output of interference canceller 106, that is, soft decision data subjected to interference cancellation processing is sent to de-interleaving circuit 7011 of channel processing circuit 701. De-interleaving circuit 7011 applies deinterleave to the demodulated data after being subjected to interference cancellation processing. The deinterleaved demodulated data is sent to error correction(FEC)/decoding circuit 7012, where error correction codes are decoded.

The error-corrected received data is sent to error correction(FEC)/coding circuit 7013, where error correction codes are coded. The data subjected to error correction/coding processing is sent to interleaving circuit 7014 and interleaved there. The interleaved data is sent to modulation circuit 7015 and subjected to modulation processing.

After adder 7016 multiplexes the modulated data with a pilot symbol, multiplier 7018 multiplies the data by the channel estimated value obtained at interference canceller 106. Then, the data multiplied by the channel estimated value is subjected to spreading/modulation processing using the spreading code used at the despreading circuit of interference canceller 106 and then combined with delayed signals by combiner 7019 into a replica signal.

Each replica signal is sent to combination circuit 702 and combined there. The combined replica signal is output to adder 703. Adder 703 calculates a difference between the post-AAA received data and the combined replica signal and outputs the difference to the weight control circuit as an error signal.

Figure 8:
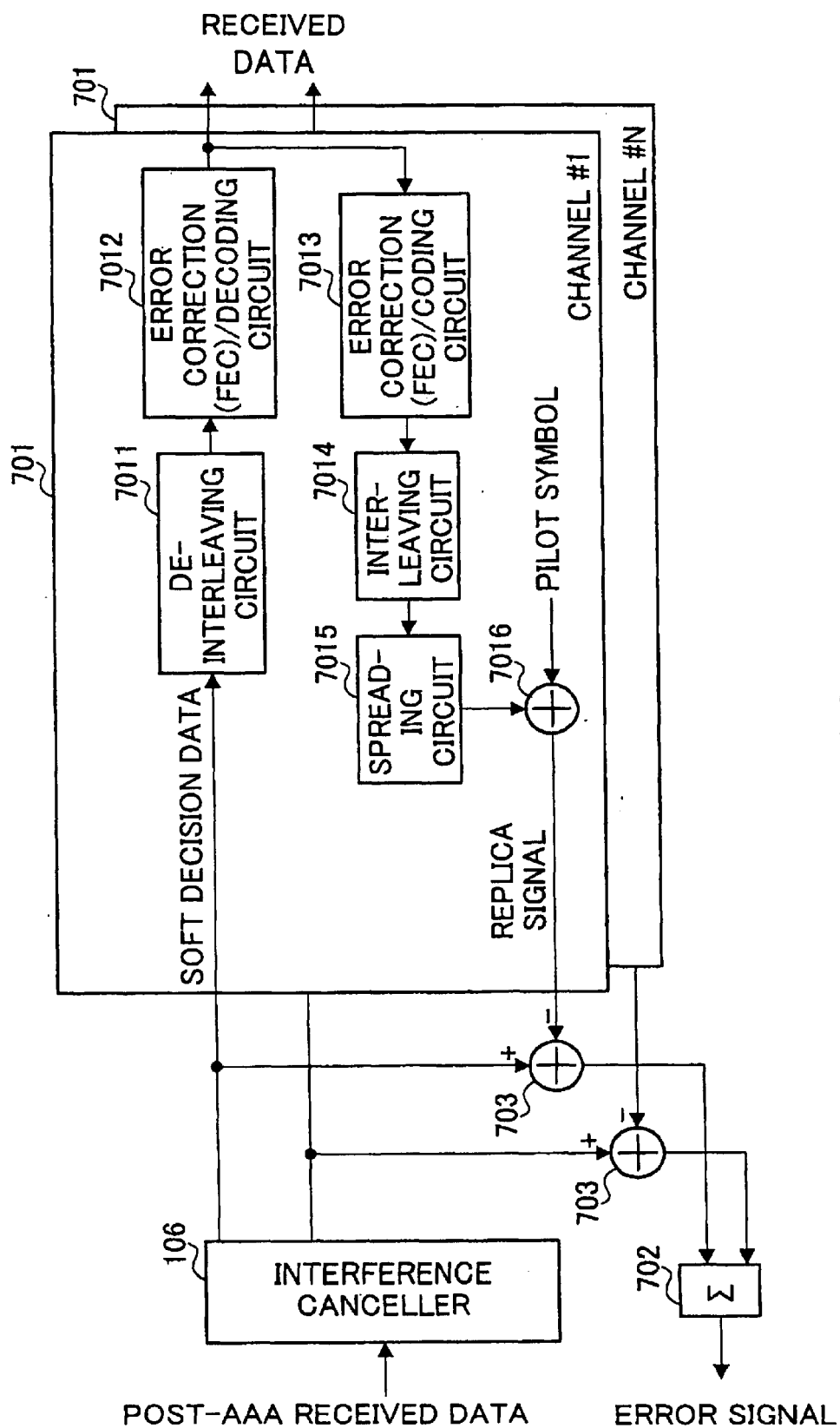
FIG. 8 is a block diagram showing another example of part of the configuration of the radio base station apparatus according to Embodiment 4 of the present invention.

FIG. 8 is a block diagram showing another example of part of the configuration of the radio base station apparatus according to Embodiment 4 of the present invention. This embodiment in this configuration describes a case where the signal obtained by applying error correction/decoding to a signal subjected to interference canceller processing is used as a reference signal and, group directivity control is performed using a difference between the reference signal and the signal after the interference canceller as an error signal.

The operations until deinterleave, error correction/decoding processing, error correction/coding processing, interleave, modulation processing and multiplexing with pilot symbols are applied to the output of interference canceller 106, that is, soft decision data subjected to interference cancellation processing are the same as above.

This multiplexed data is output to adder 703 as a replica signal. This replica signal is symbol data. The symbol data obtained when interference cancellation processing is applied to the post-AAA received data is output to adder 703. Adder 703 calculates a difference between the replica signal, which is the symbol data and the symbol data from the interference canceller and sends this difference to the weight control circuit as an error signal.

Using the replica signal of the symbol data in this way can reduce the processing speed compared to processing in chip units and reduce the hardware scale.

When decision data after error correction/decoding processing is used as the replica signal, it is also possible to adopt a configuration using the signal after coherent detection and RAKE combining for all the replica signal, post-AAA reception signal and error signal.

Embodiments 1 to 4 above describe the case where the interference canceller is an MUD. Examples of MUD include a multi-stage type interference canceller in which the receiving side generates interference replicas of other users based on estimated reception fading complex envelope and decision data and subtracts this replica from the reception signal, thereby improving an SIR (Signal to Interference Ratio) for subsequent users and improving the reception characteristic, and a symbol ranking type interference canceller which calculates likelihood symbol by symbol for all symbols of all users, ranks the calculation results, generates replicas starting from the symbol with the highest likelihood, removes these replicas from the input signal, and by repeating all this procedure, improves an SIR with respect to other symbols and thereby improves the reception characteristic.

The present invention is not limited to Embodiments 1 to 4 above, but can be implemented with various modifications. For example, Embodiments 1 to 4 above can be implemented, combined with one another as appropriate.

The radio base station apparatus of the present invention comprises an adaptive array antenna reception section that carries out adaptive array antenna reception processing on a signal from a communication terminal apparatus, an interference canceller that carries out interference cancellation processing on the signal subjected to the adaptive array antenna reception processing, a reference signal generation section that generates a reference signal of the signal from the communication terminal apparatus from the demodulated data after the interference cancellation processing, and a weight control section that controls reception weights used for adaptive array antenna reception processing using a difference between the signal subjected to the adaptive array antenna reception processing and the reference signal.

By generating a reference signal using the signal after being subjected to interference cancellation processing, this configuration improves the reliability of an error signal and can also carry out weight control with high accuracy. This makes it possible to improve the reception characteristics of uplink signals. This further makes it possible to improve the reception performance of uplink signals and reduce transmit power at the communication terminal, thereby reduce interference in the system and increase the system capacity.

The radio base station apparatus of the present invention in the above configuration is also configured with the interference canceller further including a channel estimation section that carries out channel estimation using a signal from the communication terminal apparatus and a replica signal generation section that generates a replica signal using the signal from the communication terminal apparatus, wherein the replica signal generation section generates a reference signal using the channel estimated value.

This configuration allows the interference canceller to be also used to generate reference signals, making it possible to reduce the hardware scale.

The radio base station apparatus of the present invention in the above configuration is also configured to include an error correction processing section that carries out error correction processing on the demodulated data after interference cancellation processing, wherein the reference signal generation section generates a reference signal using the output of the error correction processing section.

This configuration makes it possible to select a channel for generating a reference signal and reduce the amount of calculation. Selecting a channel with high transmit power makes it possible to generate a reference signal correctly and reduce transmit power of the channel through transmit power control, thereby reducing interference, with other stations.

The radio base station apparatus of the present invention in the above configuration is also configured in such a way that a plurality of communication terminal apparatuses is divided into groups based on the directions of arrival of signals from the communication terminal apparatuses and reception weights are calculated group by group.

By grouping communication terminal apparatuses for calculation of reception weights and using weights calculated group by group, this configuration can reduce the number of reception weights. This makes it possible to reduce the amount of calculation to calculate reception weights.

The radio base station apparatus of the present invention in the above configuration is also configured to include a selection section for selecting a communication terminal apparatus used to generate a reference signal from among the communication terminal apparatuses that belong to a group.

This configuration improves the reliability of a replica signal, which becomes a reference signal and allows weight control of an adaptive array antenna with higher accuracy.

The radio base station apparatus of the present invention comprises an adaptive array antenna reception section that carries out adaptive array antenna reception processing on a signal from a communication terminal apparatus, an interference canceller that carries out interference cancellation processing on the signal subjected to the adaptive array antenna reception processing, an error correction section that carries out error correction processing on the demodulated data after being subjected to the interference cancellation processing, a reference signal generation section that generates a reference signal in symbol units of the signal from the communication terminal apparatus from the demodulated data after being subjected to the error correction processing, and a weight control section that controls reception weights used for adaptive array antenna reception processing using a difference between the signal subjected to the interference cancellation processing and the reference signal.

This configuration makes it possible to reduce the processing speed compared to processing in chip units and thereby reduce the hardware scale.

The communication terminal apparatus is characterized by carrying out a radio communication with the radio base station apparatus in the above configuration. This allows the communication terminal apparatus to transmit signals with relatively small transmit power. This makes it possible to reduce interference of the communication terminal apparatus.

The radio communication method of the present invention comprises an adaptive array antenna receiving step of carrying out adaptive array antenna reception processing on a signal from a communication terminal apparatus, an interference canceling step of carrying out interference cancellation processing on the signal subjected to the adaptive array antenna reception processing, a reference signal generating step of generating a reference signal of the signal from the communication terminal apparatus from the demodulated data after being subjected to the interference cancellation processing, and a weight controlling step of controlling reception weights used for adaptive array antenna reception processing using a difference between the signal subjected to the adaptive array antenna reception processing and the reference signal.

By generating a reference signal using the signal after being subjected to interference cancellation processing, this method improves the reliability of an error signal and can also carry out weight control with high accuracy. This makes it possible to improve the reception characteristics of uplink signals. This further makes it possible to improve the reception performance of uplink signals and reduce transmit power at the communication terminal, thereby reduce interference in the system and increase the system capacity.

The radio communication method of the present invention comprises an adaptive array antenna receiving step of carrying out adaptive array antenna reception processing on a signal from a communication terminal apparatus, an interference canceling step of carrying out interference cancellation processing on the signal subjected to the adaptive array antenna reception processing, an error correction processing step of carrying out error correction processing on the demodulated data after the interference cancellation processing, a reference signal generating step of generating a reference signal in symbol units of the signal from the communication terminal apparatus from the demodulated data after being subjected to the interference cancellation processing, and a weight controlling step of controlling reception weights used for adaptive array antenna reception processing using a difference between the signal subjected to the interference cancellation processing and the reference signal.

This method makes it possible to reduce the processing speed compared to processing in chip units and thereby reduce the hardware scale.

As described above, the radio base station apparatus and radio communication method of the present invention generate a reference signal (replica signal) from the signal after interference elimination and perform group directivity control using a difference between the reference signal and post-AAA reception signal as an error signal, and can thereby improve the reception characteristics of uplink signals and increase the system capacity by combining the AAA and the interference canceller without increasing the hardware scale.

This application is based on the Japanese Patent Application No. 2000-009701 filed on Jan. 19, 2000, entire content of which is expressly incorporated by reference herein.

INDUSTRIAL APPLICABILITY

The present invention is applicable to a radio base station apparatus and radio communication method in a digital radio communication system, and a DS-CDMA system in particular.

What is claimed is:

1. A radio base station apparatus comprising:

a receiver that receives a code multiplexed signal including signals from a plurality of communication terminals;

an adaptive array antenna processing section that performs adaptive array antenna processing on the code multiplexed signal;

a multi-user type interference canceller that generates a replica signal corresponding to the plurality of communication terminals and performs interference cancellation on the signal processed by the adaptive array antenna, using said replica signal; and a calculator that uses a difference between the signal processed by the adaptive array antenna and the replica signal as an error signal and calculates a weight for use in the adaptive array antenna processing section.

2. The radio base station apparatus of claim 1, wherein the calculator divides the plurality of communication terminals into a plurality of groups according to arrival directions of individual signals from said plurality of communication terminals and calculates a weight per group.

3. A radio communication method comprising:

(a) receiving a code multiplexed signal including signals from a plurality of communication terminals;

(b) performing adaptive array antenna processing on the code multiplexed signal;

(c) generating a replica signal corresponding to the plurality of communication terminals and performing interference cancellation on the signal, on which the adaptive array antenna processing has been performed, using said replica signal; and (d) using a difference between the signal, on which the adaptive array antenna processing has been performed, and the replica signal as an error signal and calculating a weight for use in step (b).

* * * * *